(12) United States Patent
Tyson

(10) Patent No.: US 6,503,392 B1
(45) Date of Patent: Jan. 7, 2003

(54) DISTRIBUTION BOX FOR A WASTEWATER TREATMENT SYSTEM

(75) Inventor: James E. Tyson, Raleigh, NC (US)

(73) Assignee: Zabel Environmental Technology, Crestwood, KY (US)

( * ) Notice: Subject to any disclaimer, the term of this patent is extended or adjusted under 35 U.S.C. 154(b) by 0 days.

(21) Appl. No.: 09/824,400

(22) Filed: Apr. 2, 2001

(51) Int. Cl.⁷ .................................................. E03F 7/00
(52) U.S. Cl. ................ 210/170; 210/532.2; 137/561 A; 137/579; 405/40; 405/51
(58) Field of Search ............................. 210/170, 532.2; 137/561 A, 577, 579; 405/36, 40, 51

(56) References Cited

U.S. PATENT DOCUMENTS

| | | | | |
|---|---|---|---|---|
| 4,303,350 A | * | 12/1981 | Dix | 210/170 |
| 4,605,501 A | | 8/1986 | Tyson | |
| 4,614,584 A | * | 9/1986 | DiDuca | 210/532.2 |
| 4,756,827 A | * | 7/1988 | Mayer | 210/170 |
| 4,789,487 A | * | 12/1988 | Wallace | 210/532.2 |
| 4,838,731 A | * | 6/1989 | Gavin | 210/532.2 |
| D309,007 S | | 7/1990 | Tyson | |
| 5,098,568 A | | 3/1992 | Tyson | |
| 5,322,387 A | * | 6/1994 | Heine et al. | 405/36 |
| D349,067 S | | 7/1994 | Li | |
| 5,680,989 A | * | 10/1997 | Plachy et al. | 137/561 A |
| 6,112,766 A | * | 9/2000 | Zoeller et al. | 405/51 |
| 6,152,650 A | * | 11/2000 | Heine | 210/170 |

* cited by examiner

Primary Examiner—Christopher Upton
(74) Attorney, Agent, or Firm—Charles G. Lamb; James Daly, IV; Middleton Reutlinger

(57) ABSTRACT

A flow distribution box for a wastewater treatment system includes an inlet into a back wall and outlets in the opposed outer side walls and front wall, the distribution box including a plurality of flow dividers therein to compartmentalize effluent within the flow distribution box. A flow director is disposed in the inlet into the flow distribution box for directing the flow into selected compartments within the distribution box. Each of the outlets in the box is in flow communication with a conduit leading into a selected area of a drain field.

11 Claims, 3 Drawing Sheets

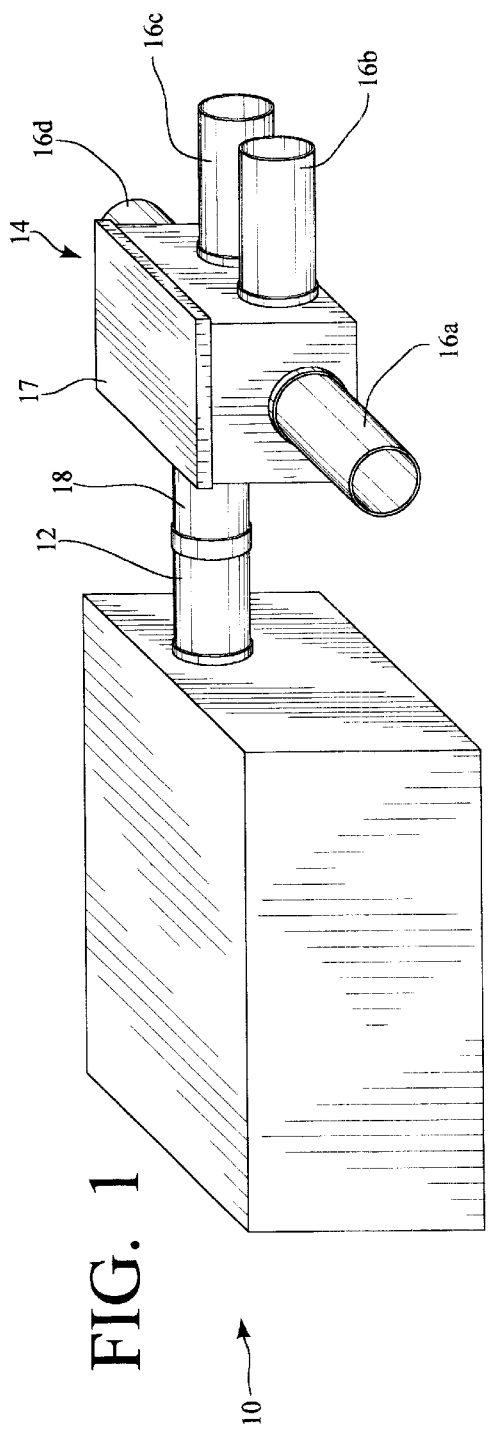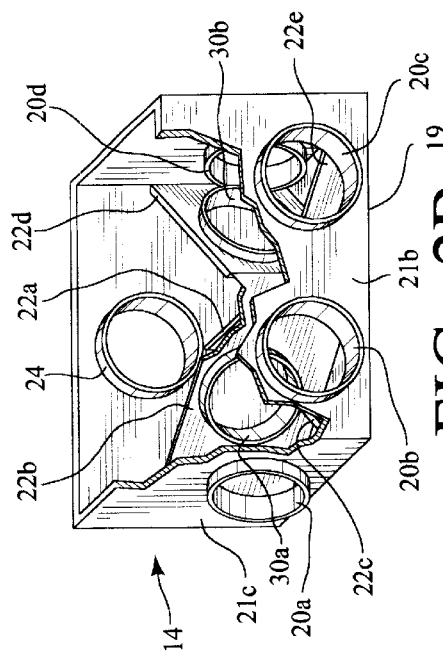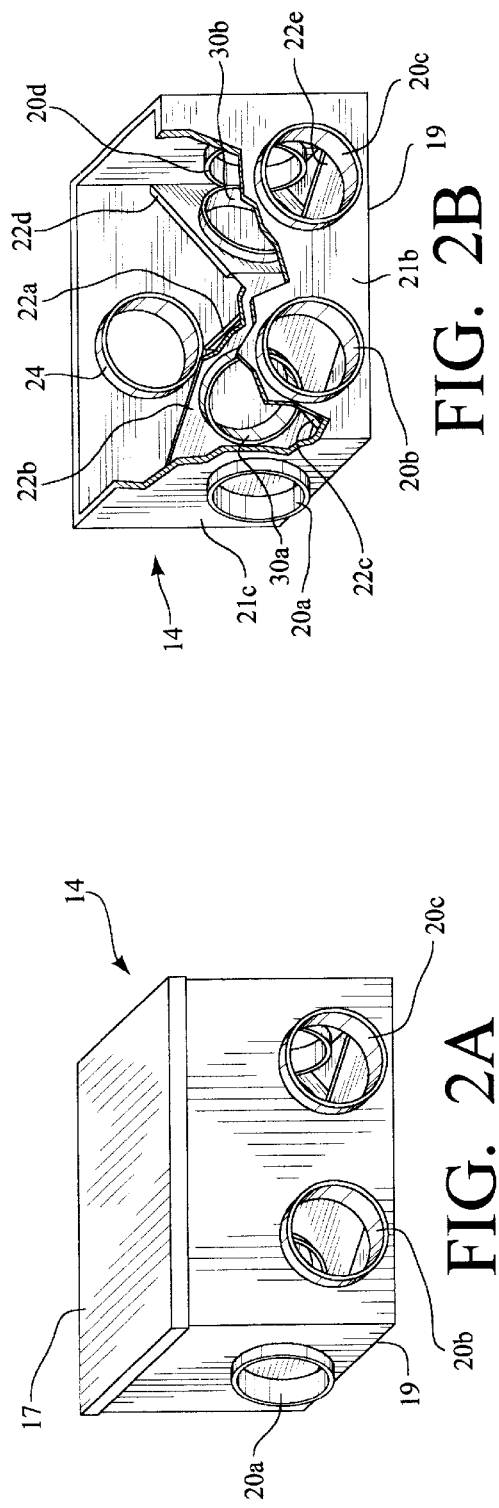

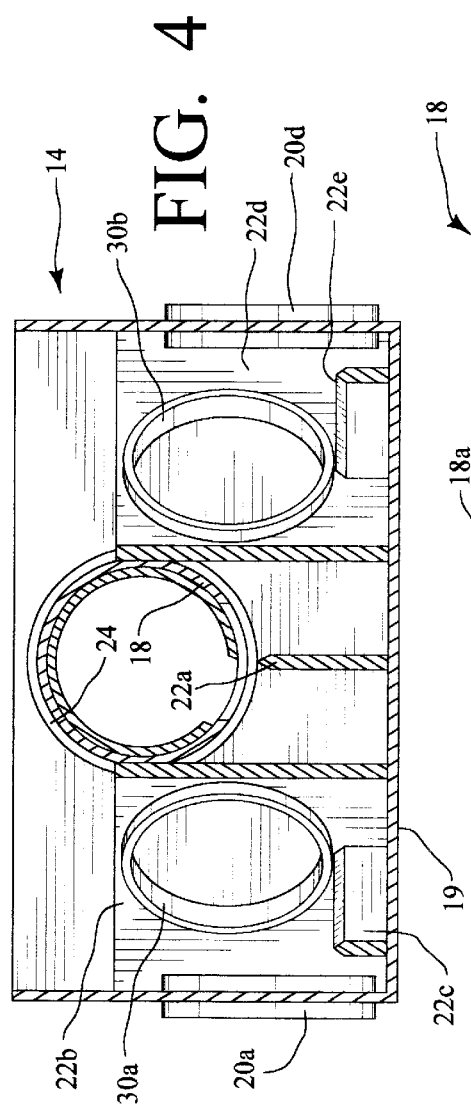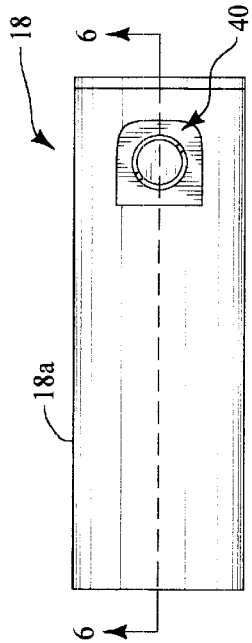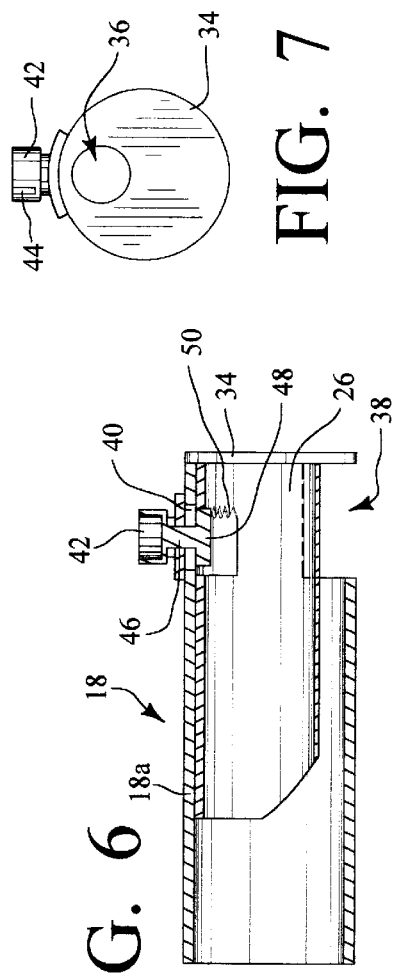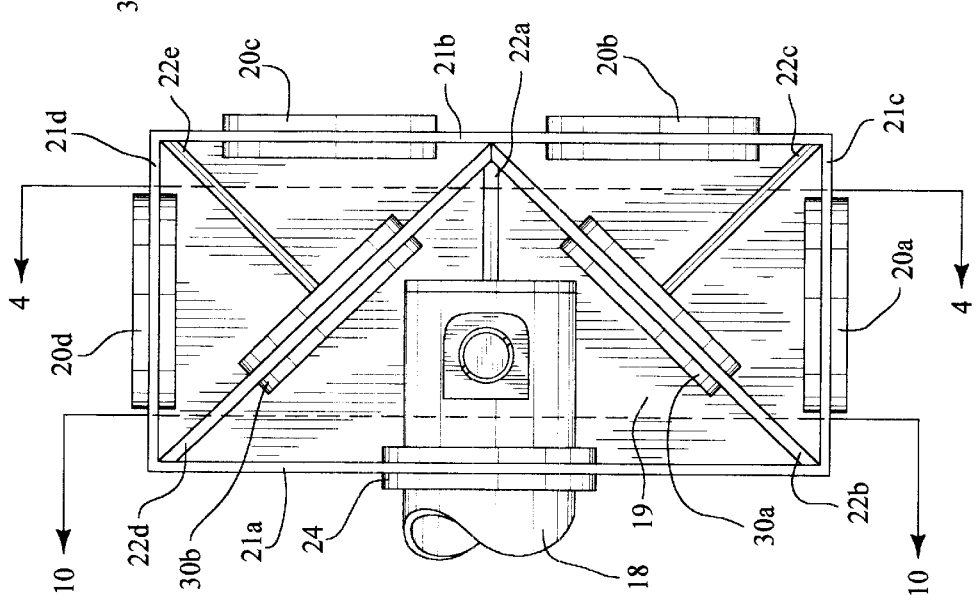

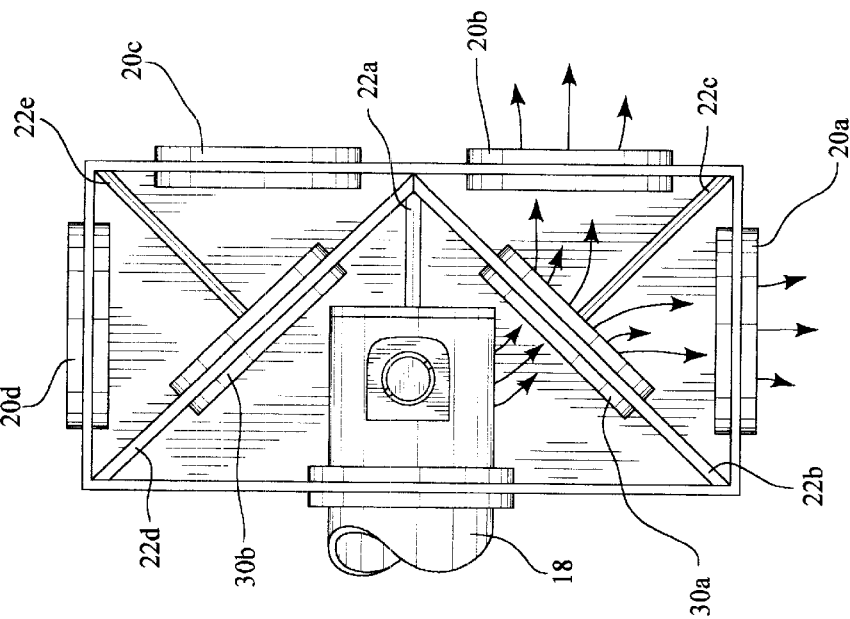
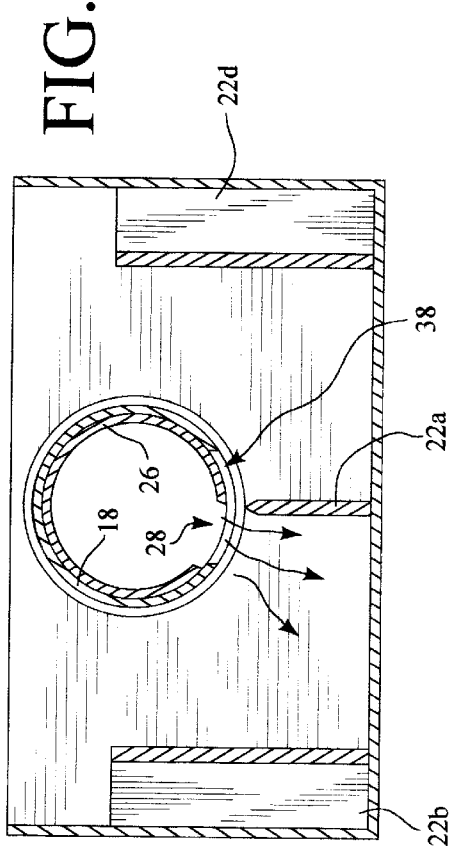
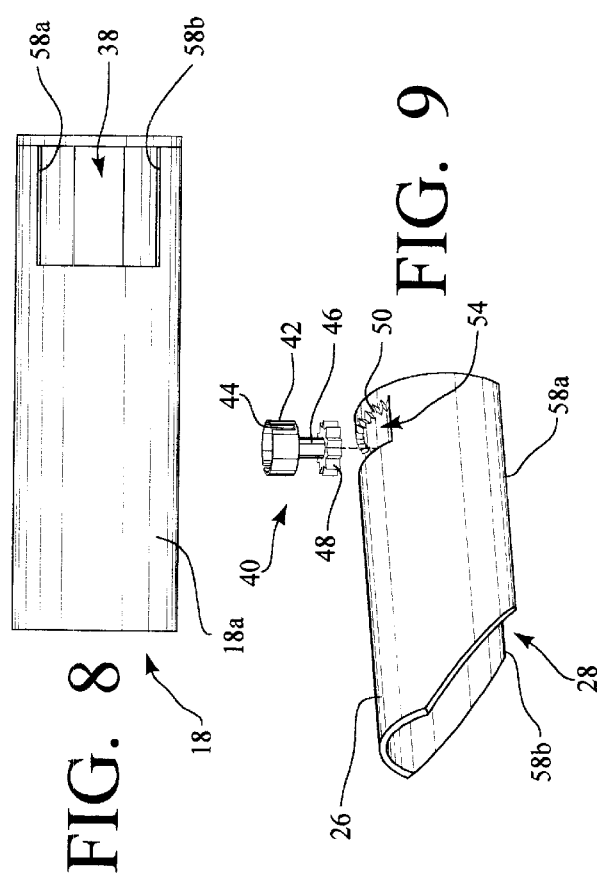

DISTRIBUTION BOX FOR A WASTEWATER TREATMENT SYSTEM

BACKGROUND OF THE INVENTION

The present invention relates to a distribution device for diverting the flow of effluent from a wastewater treatment system into selected areas of a drain field and more particularly to a distribution box into which effluent wastewater is received and then distributed to preselected outlets from the box into selected areas of a drain field.

Wastewater treatment systems and particularly septic tanks are provided with effluent outlets whereby effluent from the tank is pumped or by gravity fed into a drain field. In order to uniformly distribute effluent into a wide area of a drain field, it is necessary to provide means to direct the flow of effluent to these selected areas. In particular, U.S. Pat. No. 5,098,568 teaches a distribution joint for a septic tank system which includes a fixed flow divider to apportion the effluent between two absorbing fields. An adjustable flow control valve is taught to vary the relative amounts of effluent to be distributed between the two fields without disturbing the effluent. However, there is a need for a distribution system for effluents which provides the means to control the flow of effluent into more than two areas of a drain field.

SUMMARY OF THE INVENTION

It is an object of the present invention to provide a flow distribution box for the distribution of effluent into a plurality of selected areas of a drain field.

It is another object of the present invention to provide a distribution box which includes a plurality of compartments therein for receiving effluent from a wastewater treatment system wherein each compartment within the distribution box is in flow communication with an outlet into a selected area of a drain field.

It is also an object of the present invention to provide a distribution box which directs wastewater effluent into at least four selected areas of a drain field.

It is a further object of the present invention to provide a wastewater effluent distribution apparatus which is inexpensive to produce and highly efficient.

More particularly, the present invention provides a distribution box for a wastewater treatment system wherein the box has a top, a bottom, a back wall, a front wall, and spaced first and second outer side walls, each of the walls being connected to the bottom. An inlet from a wastewater treatment system is disposed within the back wall and at least one outlet is provided in each of the side walls and the front wall. A flow directing device is disposed within the inlet to deliver wastewater effluent in a preselected location within the distribution box. A plurality of flow dividers are provided along the bottom of the box dividing the box into a plurality of compartments into which the effluent is directed. Each of the compartments is in flow communication with one of the outlets thereby allowing for the flow director to direct effluent into selected compartments which in turn provides the effluent for selected outlets, which, in turn is in communication with conduits or laterals into selected areas of a drain field.

Other objects and advantages of the invention may be obtained by consideration of the drawings and the detail of a preferred embodiment set forth hereinafter.

BRIEF DESCRIPTION OF THE DRAWINGS

FIG. 1 is a perspective view of one preferred effluent distribution box of the present invention in flow communication with a septic tank;

FIG. 2A is an enlarged perspective view of the distribution box of FIG. 1;

FIG. 2B is a perspective view of the distribution box of FIG. 2A with the top removed and selected portions cutaway;

FIG. 3 is a top view of the distribution box of FIGS. 2A, 2B;

FIG. 4 is a sectional view taken along line 4—4 of FIG. 3;

FIG. 5 is a top view of one preferred flow director of the present invention;

FIG. 6 is a sectional view taken along line 6—6 of FIG. 5;

FIG. 7 is an end view of the flow director device of FIG. 5;

FIG. 8 is a bottom view of the flow director device of FIG. 5;

FIG. 9 is an exploded view of a cylindrical flow directing sleeve of the flow director of FIG. 5 and a control assembly for rotating the flow directing;

FIG. 10 is a sectional view taken along line 10—10 of FIG. 3 showing the flow directing sleeve directing effluent into a selected compartment; and, FIG. 10A is a top view of the distribution box of the present invention showing the flow of effluent in response to the setting of the flow directing sleeve, as shown in FIG. 10.

DETAILED DESCRIPTION OF THE PREFERRED EMBODIMENT

As best shown in FIG. 1, a distribution box 14 of the present invention is in flow communication with a septic tank 10 by means of effluent line 12. The distribution box 14 is provided with a plurality of distribution lines 16a, 16b, 16c, and 16d leading to selected areas of a drain field. Flow from the septic tank 10 may be by gravity or by a pump within the septic tank 10 which provides for the flow of effluent into the distribution box 14. Within the distribution box 14, the effluent is divided in desired amounts into compartments within the box 14 which are in flow communication with the outlet conduits 16a, 16b, 16c, and 16d.

Referring now to FIGS. 2A, 2B, 3 and 4, distribution box 14 is provided with a top 17, a bottom 19, a back wall 21a, a front wall 21b and spaced outer side walls 21c and 21d. Centrally located and in an upper portion of the back wall 21a is an opening 24 with a coupling therein. Centrally located, and in the lower portions of the outer side walls 21c and 21d are openings 20a and 20d with couplings disposed therein for connection to conduits 16a and 16d, which as shown in FIG. 1, are directed into selected areas of a drain field. Also, located in the lower portion of the front wall 21b is a pair of spaced openings 20b and 20c which receive couplings therein for connections to drain field conduits 16b and 16c, respectively. A plurality of flow dividers, and inside walls, are also provided within the distribution box 14 for separating the flow of the effluent and also compartmentalizing the effluent for distributing the effluent into selected areas of the drain field. Flow divider 22a extends from beneath the opening 24 to a location between the openings 20b and 20c. The height of the flow divider 22a is from the bottom wall 19 to the lowest extremity of the opening 24. Inside wall 22b extends from the juncture of the back wall 21a with outer side wall 21c and connects with the flow divider 22a at a location between the openings 20b and 20c in the front wall 21b. The inside wall flow divider 22b is at a height approximately the mid-point of the opening 24.

Disposed within the inside wall 22b, approximately midway from the back to the front of the distribution box 14, is an opening 30a which has a diameter equal to or less than the opening in the back wall 24. The opening 30a is at an elevation below the upper most point of the opening 24. Also, inside wall 22d extends between the juncture of the back wall 21a with the outer side wall 21d to the center point of the front wall 21b and connects with the inside wall 22b. The inside wall 22d is of substantially the same height as the inside wall 22b and is also provided with a centrally disposed opening 30b therein, also at approximately the same height as the opening 30a. A flow divider 22c is provided to extend from the juncture of the front wall 21b with the outer side wall 21c, and connects to the inside wall 22b at a location just below the bottom edge of the opening 30a. A flow divider 22e is also provided wherein the flow divider 22e extends from the juncture of the front wall 21b and the outer side wall 21d to a location just beneath the opening 30b. Flow divider 22e is approximately the same height as flow divider 22c. Preferably, flow dividers 22a, 22c and 22e are sharp on top and tapered downward with as little shoulder as possible to minimize the accumulation of scum. The top is sloped downwards and then leveled off to make a sharp division of the affluent and to provide a slope to assist in washing down accumulation on the top of the flow divider.

In the location of the flow dividers, it is noted that the inside walls 22b and 22d have an uppermost elevation or height above the uppermost height of the flow divider 22a and the flow divider 22a has an elevation or height greater than the flow dividers 22c and 22e. Also, the uppermost elevation of opening 24 is greater than the uppermost elevation of openings 30a and 30b and in turn the openings 30a and 30b have an uppermost elevation greater than the uppermost elevation of side wall openings 20a and 20d and the front wall openings 20b and 20c. Thus, it is seen that when the flow through the opening 24 is directed into the compartment defined by the inside walls 22b and 22d, the compartment on one side of flow divider 22a will fill to a selected level and then will flow through the opening 30a into the compartments which provide the flow to the openings 20a and 20b. Conversely, when the flow is directed into the compartment defined by the flow divider 22a and inside wall 22d, the effluent fills to a selected level and then flows through the opening 30b and into the compartments which feed the outlet openings 20c and 20d and in turn the drain field serviced by the conduits 16c and 16d.

Referring now to FIGS. 5–9 is a flow director assembly 18 which is in flow communication with the effluent line 12 and extends through the opening 24 a preselected distance into the distribution box 14. The flow director assembly 18 includes a cylindrical outer sleeve 18a having a terminating disc or end plate 34 with an observation opening 36 disposed in the upper portion of the disc 34. The observation point 36 provides access into the interior of the flow director assembly 18 as well as providing a view into the operation of the flow director assembly 18. A bottom discharge opening 38 in the sleeve 18a is the flow inlet into the flow distribution box 14. Sleeve 18a is also provided with an opening therein to receive a control sleeve operating assembly 40.

As best shown in FIGS. 6 and 9 is an inner flow control sleeve 26 and the control sleeve operating assembly 40 wherein the flow control sleeve 26 is rotatable in response to the actuation of the assembly 40. The inner flow control sleeve 26 is provided with a cut-out or slit 28 which defines a bottom opening for flow communication with the discharge opening 38 in the outer sleeve 18a. The slit or cut-out 28 extends from an upstream end of the control sleeve 26 to a preselected distance from the front terminating end of the inner flow control sleeve 18a. As best shown in FIG. 8, terminating edges 58a and 58b define the width and length of the slit or cut-out 28 as well as the discharge into the discharge opening 38. The cut-out 54 is provided in the control sleeve 26 for the receipt of the control sleeve operating assembly 40. The control sleeve operating assembly 40 includes a cylindrical gear portion 48 having teeth thereon in mating relation with teeth 50 which are provided along the front end of the cut-out 54 whereby the rotation of the shaft 46, upon which the gear 48 is attached, rotates the control sleeve 26 to desired locations. A device for turning the shaft 46 is shown as a turn knob 42 with a slot 44 therein which could receive a handle (not shown) therein thereby enabling a user ability to turn and adjust the sleeve 26 for different positions of flow into the distribution box 14.

FIGS. 10 and 10A show one operating position for the flow director 18 to illustrate one operation for flow of the effluent into and through the distribution box 14. As shown, the control sleeve 26 is aligned so that the slit 28 in the sleeve 26 is positioned over the discharge opening 38 so that the effluent flows substantially evenly into the compartment defined by inside walls 22b and 22d. As the effluent in the compartments defined by the inside walls 22b and 22d fills, the effluent then flows out and into the compartments which are fed by outlets 30a and 30b. As these compartments fill to the level of the openings 20a, 20b, 20c and 20d, then the effluent will flow outwardly into the drain fields supplied by conduits 16a, 16b, 16c, and 16d. As best shown in FIG. 10, it is easily seen that by moving the opening 28 in relation to the discharge opening 38, the flow can be directed to either side of the divider 22a therefore using either side of the distribution box 14. Furthermore, openings 20a, 20b, 20c and 20d are spaced from the bottom of the box 14 so that box 14 does not have to be exactly level for reasonably even flow distribution through the outlets and into the drain field.

It is not intended that the invention be limited to the very specific embodiments shown and described herein, but rather all equivalents which are obvious to those skilled in the art are meant to be included within the invention as set forth in the specification and the claims which are appended hereto.

What is claimed is:

1. A distribution box for a wastewater treatment system comprising:

a distribution box having a top, a bottom, a back wall, a front wall, spaced first and second outer side walls, each of said outer side walls being connected to said bottom, a first inside wall extending from the juncture of said back wall and said first outer side wall to a mid-point of said front wall, and a second inside wall extending from the juncture of said back wall with said second outer side wall and substantially the mid-point of said front wall;

an inlet into said back wall in flow communication with a wastewater treatment tank;

a flow director in said inlet positioned to deliver wastewater effluent in a preselected direction into a plurality of compartments in said box;

at least one outlet opening in each of said outer side walls and said front wall; and, a plurality of flow dividers extending along said bottom dividing said box into said plurality of compartments, each of said compartments being in flow communication with an outlet opening, said flow dividers including a first flow divider extending from the mid-point of said back wall to a mid-point of said front wall.

2. The distribution box of claim 1 wherein said flow director includes an outer cylindrical sleeve with a bottom discharge opening with an inner cylindrical-shaped flow control sleeve rotatable therein, said cylindrical-shaped control sleeve having an opening along a bottom for cooperating with said discharge opening in said outer sleeve for determining the direction of flow of effluent through said flow director.

3. The distribution box of claim 2, said flow director having a control sleeve operating assembly disposed along a top portion of said flow director, said inner cylindrical flow control sleeve being operated in response to movement of said control operating assembly.

4. The distribution box of claim 1 wherein said flow director includes an opening in an end portion for access into said flow director.

5. The distribution box of claim 1, said inlet being positioned above said outlets.

6. The distribution box of claim 1, said front wall including two horizontally spaced outlets.

7. The distribution box of claim 1 wherein said outlets in said outer side walls are centrally disposed within said outer side walls at a lower portion thereof.

8. The distribution box of claim 1 including a second flow divider extending from the juncture of said front wall with said first outer side wall and a mid-point of said first inside wall and a third flow divider extending from a juncture of said front wall with said second outer side wall and a mid-point of said second inside wall.

9. The distribution box of claim 8 wherein said first and second inside walls are of the same height which is greater than the second and third flow dividers and less than the height of said first flow divider.

10. The distribution box of claim 9 wherein said first inside wall and said second inside wall include an opening therein in flow communication with the flow of effluent from one side of said first and said second inside walls to the opposite side of said first and said second inside walls.

11. The distribution box of claim 1, said at least one outlet in each of said outer side walls and said front wall being spaced from said bottom.

* * * * *